Patented Nov. 7, 1950

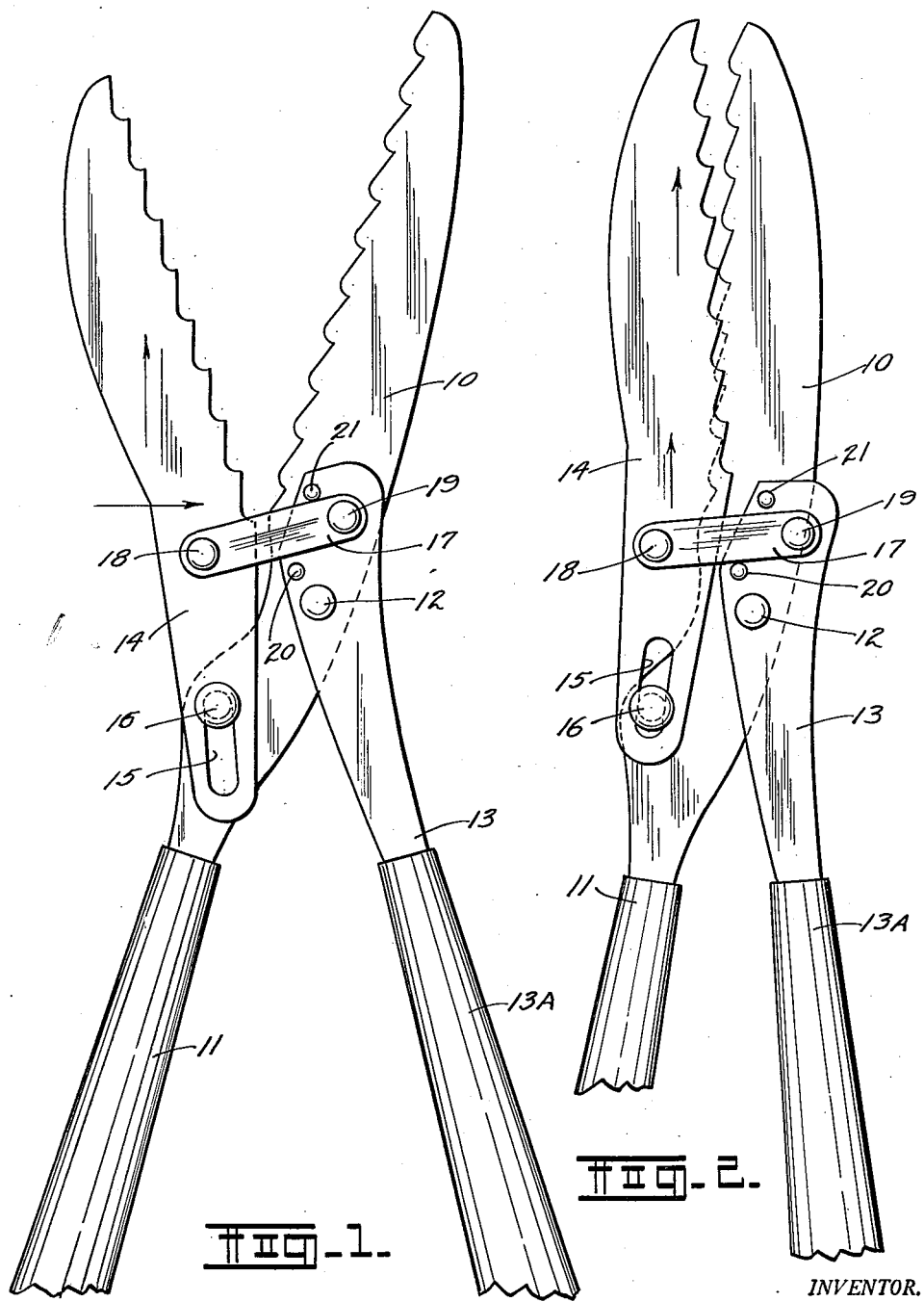

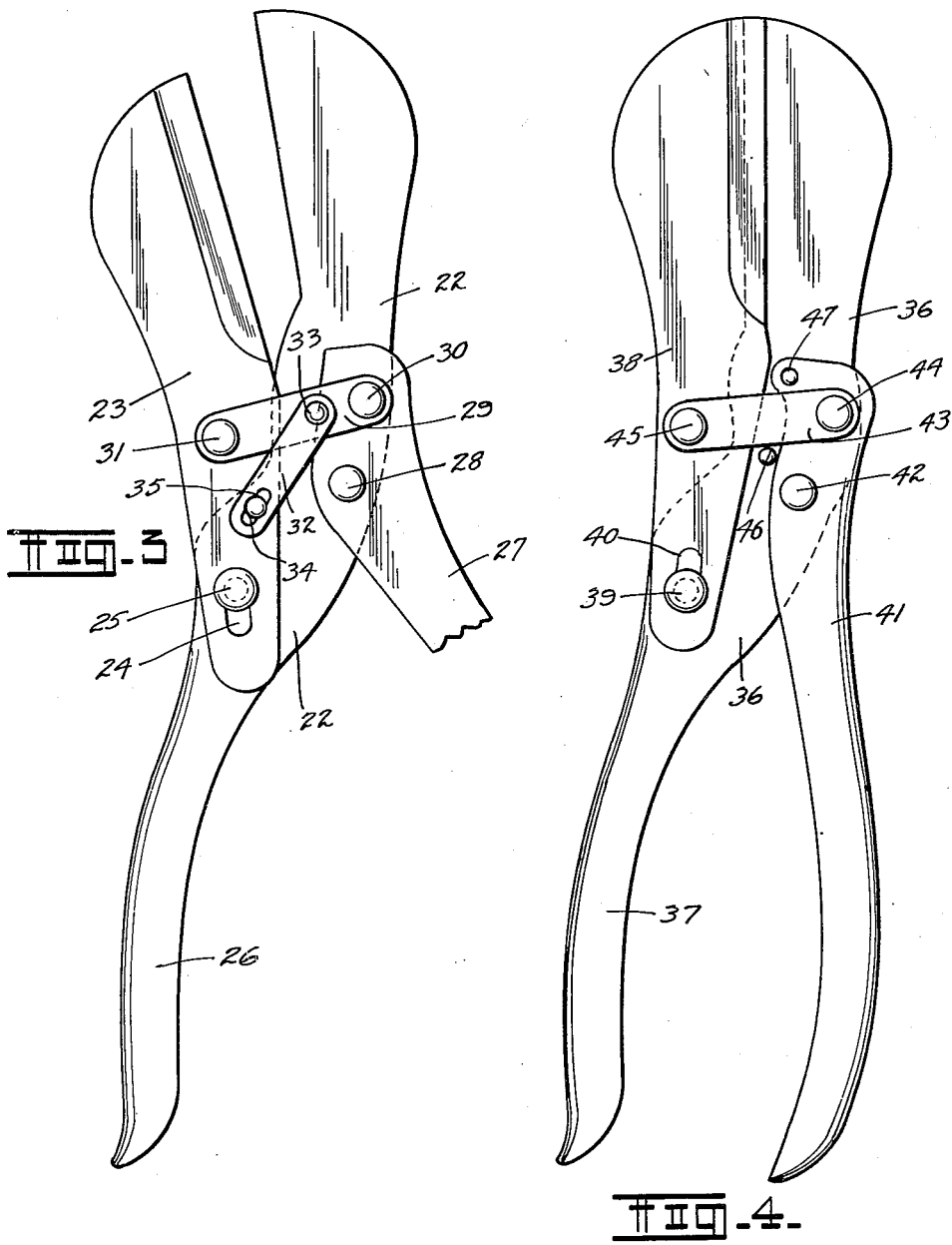

2,528,816

UNITED STATES PATENT OFFICE 2,528,816

HEDGE SHEARS

Hugh N. Boyer, Canfield, Ohio; Elizabeth M. Boyer executrix of said Hugh N. Boyer, deceased Application April 21, 1948, Serial No. 22,279

5 Claims. (Cl. 30—238)

This invention relates to hedge shears and more particularly to hedge shears incorporating a combined scissors and longitudinal blade action.

The principal object of the invention is the provision of a hedge shears having a longitudinal blade action.

A further object of the invention is the provision of an improved hedge shear incorporating leverage action in moving one of the blades longitudinally with respect to the other.

A still further object of the invention is the provision of a hedge shears incorporating an improved cutting motion whereby twigs or other material will be retained in the shears and cut by longitudinal action of one of the blades with respect to the other.

A still further object of the invention is the provision of a hedge shears wherein material to be cut is retained in the shears prior to and during an actual cutting action.

The hedge shears shown and described herein comprise an improvement in the art of shears in general in that the commonly crossed and pivoted blades of a shear have been modified to movably position one blade with respect to the other and provide means for urging the movable blade into shearing engagement with the other and for moving it longitudinally with respect thereto.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a plan view of the hedge shears with portions broken away showing the same in open position.

Figure 2 is a plan view of the hedge shears with portions broken away showing the same in approximately closed position.

Figure 3 is a top plan view of a modified form of shears with parts broken away and showing the same in open position.

Figure 4 is a top plan view of a modified form of shears showing the same in closed position.

By referring to the drawings and Figures 1 and 2 in particular it will be seen that a bottom blade 10 having a grip 11 formed thereon is pivoted by means of a pivot 12 to a handle 13 having a grip 13A formed thereon. A top blade 14 is pivoted loosely by reason of a slot 15 and pivot 16 to the bottom blade 10. A lever link 17 is pivoted to the blade 14 by a pivot 18 and to the handle 13 by a pivot 19. A pair of studs 20 and 21, respectively, are mounted on the handle 13, one above and one below the lever link 17. It will be observed that the slot 15 is formed in the top blade 14 and is positioned longitudinally of the blade 14. It will be observed that the stud 21 is in engagement with the upper edge of the lever link 17 when the hedge shears are in open position, as shown in Figure 1 of the drawings, and by referring to Figure 2 of the drawings it will be seen that the stud 20 is in engagement with the bottom edge of the lever link 17 when the hedge blades are in closed position.

It will thus be observed that when the hedge blades are in open position as shown in Figure 1 of the drawings the top blade 14 is in inward position with respect to the end section of the lower blade 10, having been moved into such position by the engagement of the stud 21 with the upper edge of the lever link 17, which action moves the upper blade 14 inwardly as the lever link 17 pivots on the pivot 19 when the grip 13A is moved away from the grip 11.

In closing the hedge shears on a twig or other member as in performing a cutting operation, moving the grip 13A toward the grip 11 will pivot the handle 13 on the pivot 12 and bring and move the pivot 19 longitudinally with respect thereto so as to move the upper blade 14 toward the lower blade 10. This action continues until the stud 20 engages the lower edge of the lever link 17 at which time it acts as a fulcrum beneath the lever link 17 and raises the same with respect to the pivot 20 thereby causing the opposite end thereof, pivoted by the pivot 18 to the blade 14, to move longitudinally or outwardly with respect to the lower blade 10. It will thus be seen that as the blades 10 and 14 close upon an object to be cut, they close first in a lateral or shearing action and secondly in a longitudinally sliding or drawing action and in final engagement overlap one another in a conventional shear-like engagement with the upper blade 14 moved outwardly having completed its longitudinal movement with respect to the lower blade 10.

Modifications in the construction and leverage action of this hedge shears are obviously possible and two such modifications are shown in Figures 3 and 4 of the drawings.

By referring to Figure 3 of the drawings a modified form of shears may be seen comprising a lower blade 22 and an upper blade 23. The upper blade 23 has a longitudinally extending slot 24 formed therein and a pivot 25 passed therethrough and through the lower blade 22. A handle 26 is formed on one end of the lower blade 22 and a secondary handle 27 is pivotally affixed by means of a pivot 28 to the lower blade 22. A lever link 29 is pivoted by means of a pivot 30 to one end of the secondary handle 27 and to the upper blade 23 by means of a pivot 31. A secondary lever link 32 is pivoted by means of a pivot 33 to the lever link 29 and is provided with a slot 34 in its opposite end and pivoted therethrough by means of a pivot 35 to the upper blade 23. It will thus be seen that when the handle 27 is moved toward the handle 26 the pivot 28 and hence the lever link 29 will move toward the right, as shown in Figure 3 of the drawings, and thereby move the upper blade 23 into engagement with the lower blade 22. As this occurs, the secondary lever link 32 will move until the pivot 35 reaches the end of the slot 34 at which time a longitudinal or outward movement will be imparted by the secondary lever link 32 to the upper blade 23 causing it to effect a draw cut with respect to the lower blade 22.

A further modification of the lever action may be seen by referring to Figure 4 of the drawings wherein a lower blade 36 is provided at one end with a handle 37 and an upper blade 38 is pivoted thereto by means of a pivot 39. The pivot 39 is positioned through a longitudinally extending slot 40 in the upper blade 38. A secondary handle 41 is pivoted by means of a pivot 42 to the lower blade 36 and a lever link 43 is pivotally affixed to one end of the secondary handle 41 by means of a pivot 44. The other end of the lever link 43 is pivotally affixed to the upper blade 38 by means of a pivot 45. A stud 46 is formed on the lower blade 36 below the lower edge of the lever link 43 and a stud 47 is formed on the end of the secondary handle 41 above the upper edge of the lever link 43. The action of this modified form of the shears is similar to that shown in Figures 1 and 2 of the drawings, and heretofore described, with the exception that the leverage applied to lift the lever link 43 is obtained by rocking action over the relatively stationary stud 46 which is positioned on the lower blade 36 rather than on the secondary handle 41 as compared with the disclosure of Figures 1 and 2 of the drawings.

It will thus be seen that the several objects of the invention are met by the device disclosed herein in that a shears of a hedge or other type is disclosed as comprising a stationary blade and a movable blade, the movable blade being capable of scissors action with respect to the stationary blade and longitudinal action with respect thereto as well. The utility of this construction will be seen in the fact that the shears as disclosed herein may be used to grasp and retain twigs or branches and the like between the blades prior to the actual closing operation at which time the actual final cutting action is in the nature of a draw cut as the movable blade moves longitudinally with respect to the stationary blade as well as in the scissors action as in a conventionally formed shears.

Having thus described my invention, what I claim is:

1. A shear comprising a blade having a secondary blade movably secured thereto for shearing action with respect thereto, a handle formed on said blade and a secondary handle pivotally secured to said blade, and a lever link pivotally secured to said secondary handle and to said secondary blade, and studs positioned on said secondary handle one on either side of the said lever link whereby movement of the secondary handle toward the blade will move the lever link and the secondary blade toward the blade in a shearing action and move the secondary blade longitudinally with respect to the blade when the said lever link engages one of the said studs.

2. A shear comprising a blade and a secondary blade, the secondary blade having a longitudinally extending slot formed therein and pivot means positioned through said slot securing the blades to one another for shearing action, a handle formed on the said blade and a secondary handle pivotally secured to said blade, a lever link pivotally secured to said secondary handle and to said secondary blade, and studs positioned on the said secondary handle one on either side of the said lever link whereby movement of the secondary handle toward the blade will move the lever link and hence the secondary blade toward the blade in a shearing action and move the secondary blade longitudinally with respect to the blade when the said lever link engages one of the said studs.

3. A shear comprising a blade having a secondary blade movably secured thereto for shearing action with respect thereto, a handle on said blade and a secondary handle pivotally secured to said blade, and a lever link pivotally secured to said secondary handle and to the said secondary blade, a stud positioned on the said secondary handle so that the said lever link lies between the said stud and the said pivot securing the said lever link to the said secondary handle and a secondary stud formed on the said blade and adjacent the said lever link so that the said lever link will engage thereagainst when the said secondary handle is moved toward the said blade and thereby cause the said lever link to move the secondary blade longitudinally with respect to the said blade.

4. A shear comprising a blade having a secondary blade movably secured thereto for shearing action with respect thereto, a handle formed on said blade and a secondary handle pivotally secured to said blade, and a lever link pivotally secured to said secondary handle and to said secondary blade, and a secondary lever link pivotally secured to said lever link midway between the ends thereof, said secondary link having a longitudinal slot formed therein and pivot means positioned in said longitudinal slot and loosely securing said secondary lever link and said secondary blade to one another whereby movement of the secondary handle toward the said blade will move the lever link and the secondary blade toward one another in a shearing action and move the secondary blade longitudinally with respect to the said blade when the secondary lever link engages the said pivot securing it to the said secondary blade.

5. A hedge shear comprising a stationary blade having a secondary blade movably secured thereto for overlapping shearing action with respect thereto and longitudinal draw cut action with respect thereto, a handle formed on the said stationary blade and a secondary handle pivotally secured to said stationary blade, a lever link pivotally secured to said stationary handle and to said secondary blade, and studs positioned on said secondary handle one on either side of said lever link whereby movement of the secondary handle toward the stationary blade will move the lever link and the secondary blade toward the stationary blade in a lateral action and move the secondary blade longitudinally with respect to the stationary blade when the said lever link engages one of the said studs, the said blades having angular serrations thereon in oppositely disposed pattern whereby a plurality of transversely and longitudinally inclined cutting edges are formed.

HUGH N. BOYER.

REFERENCES CITED

The following references are of record in the file of this patent:

UNITED STATES PATENTS

| Number | Name | Date |
|---|---|---|
| 291,966 | Waters | Jan. 15, 1884 |